Feb. 27, 1951  D. R. BRANCHFLOWER ET AL  2,543,433
ELECTRICAL APPARATUS
Filed Aug. 8, 1945
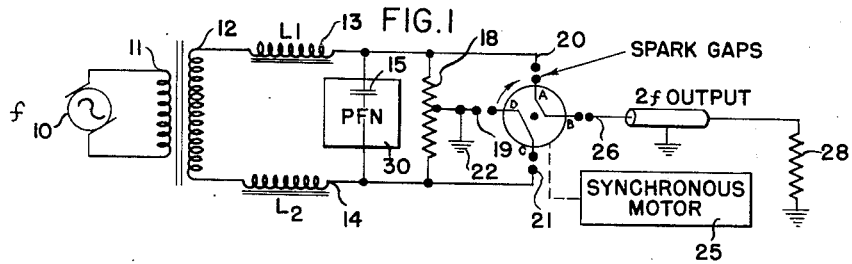
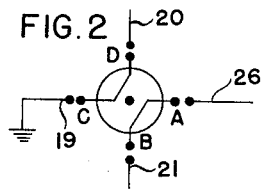
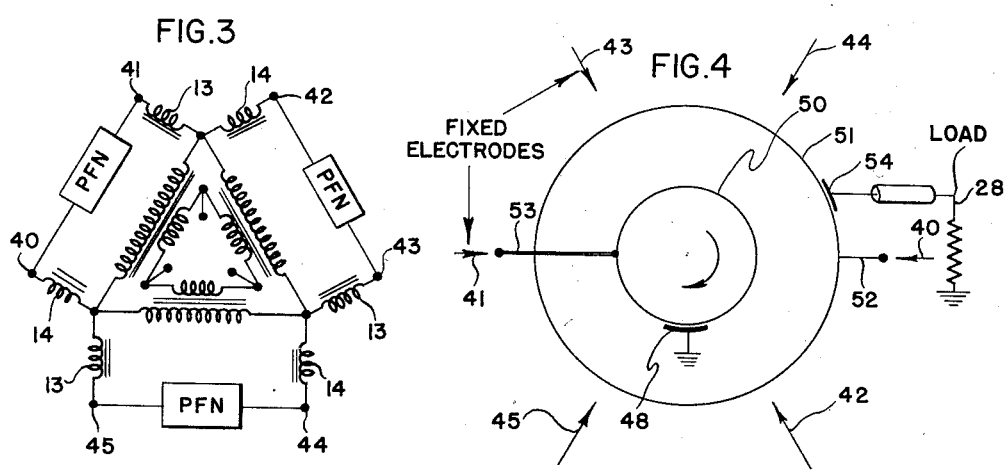
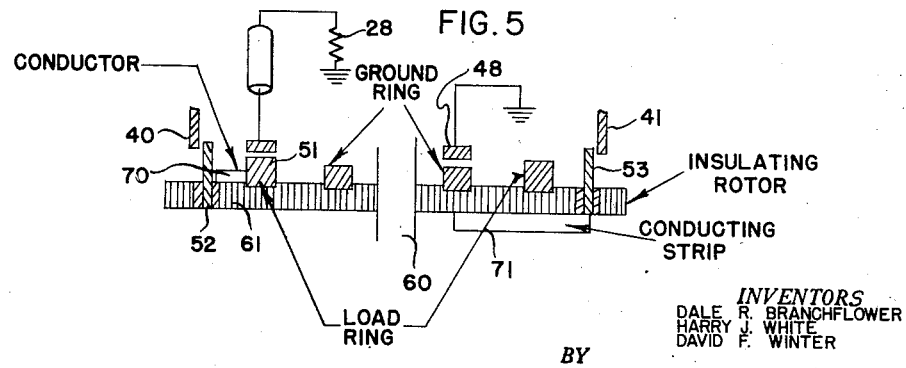
INVENTORS
DALE R. BRANCHFLOWER
HARRY J. WHITE
DAVID F. WINTER
BY
William D. Hall
ATTORNEY Patented Feb. 27, 1951

2,543,433

UNITED STATES PATENT OFFICE 2,543,433

ELECTRICAL APPARATUS

Dale R. Branchflower, Harry J. White, and David F. Winter, Cambridge, Mass., assignors, by mesne assignments, to the United States of America as represented by the Secretary of War Application August 8, 1945, Serial No. 609,650

7 Claims. (Cl. 171—97)

Our invention relates in general to methods of and apparatus for producing modulation pulses and more particularly to the type wherein the pulses so produced are a multiple of the frequency of a source of energy.

In some electrical apparatus and particularly in radio object locating devices it is necessary that modulation pulses of a predetermined rate of recurrence be produced. Accordingly, it is one of the objects of our invention to provide a simple means for producing such desired pulses.

Normally there is available for use with such apparatus a source of energy which usually has a frequency in the neighborhood of 60 cycles per second. It is another of the objects of this invention to provide an apparatus whereby modulation pulses so produced may be double that of the 60 cycle frequency or a multiple thereof.

Modulation pulses have been known heretofore to the prior art but these have suffered from the disadvantage that they demand the use of particular types of bridge circuits and vacuum tube rectifying means. It is another of the objects of our invention to provide apparatus for producing modulation pulses in which these disadvantages are obviated, and further it will be simple and rugged in construction.

In some instances the source of energy may be a multiple phase generator, and accordingly it is another of the objects of our invention to provide a device for producing modulation pulses which utilize a multiple phase source of energy to its fullest extent.

Our invention in general contemplates the provision of inductive and capacitive means in which energy may be stored from an alternating source. Operated synchronously with the storage of energy is a spark gap means for discharging energy so stored synchronously with the rate at which the energy is stored. For instance, energy may be stored on the positive half of the cycle of an alternating current wave and this energy may be discharged every half cycle of the charging current by operation of a spark gap at the proper intervals of time. The alternate storing and discharging of energy produces pulsations which occur intermittently.

Our invention will be understood best by reference to the figure of the drawings, in which:

Fig. 1 is a schematic embodiment of my invention;

Fig. 2 is an explanatory diagram of a portion of Fig. 1;

Fig. 3 is an explanatory diagram of a multiple phase source of energy and the associated storage means;

Fig. 4 schematically illustrates the action of a spark gap with the multiple phase source; and Fig. 5 is a schematic representation of the particular form of spark gap used.

Referring to Fig. 1 there is shown schematically one embodiment of our invention. In this figure a single phase source of alternating current energy supply 10 is connected to the primary 11 of a transformer. The secondary 12 of the transformer has two inductive means 13 and 14 connected serially therewith. Shunted across the serial connection of the two inductances and the transformer secondary is a storage capacitor 15 which has been identified by the initials PFN so as to identify the capacitor as being a part of a pulse forming network. The inductances 13 and 14 may be incorporated in the secondary of the input transformer as a high leakage reactance and this so as to resonate with the storage capacitor 15 of the pulse forming network. Also shunted across the capacitor 15 is a tapped resistor 18 having an arm 19 grounded at the point 22. Also shunted across the storage capacitor 15 is a spark gap arrangement. The common terminals of the capacitor 15 and the resistor 18 are connected to arms 20 and 21 positioned immediately adjacent to the spark gap. The spark gap is driven by a synchronous motor 25 shown schematically. Also positioned adjacent to the spark gap is an arm 26 which is connected to an output load identified as 28. The spark gap illustrated consists of two sets of conductors whose ends terminate at a position 90° apart and the four terminals have been identified as A, B, C, and D, respectively.

The operation of the circuit is as follows:

The spark gap rotor has four electrodes whose connection has been previously indicated and the gap itself is driven by the synchronous motor at a speed of F/2 where F is the frequency of the charging current. Accordingly, at every half cycle of the charging current, the spark gap electrodes will be in the position illustrated in the drawing. Discharge through the gap will take place whenever the electrodes thereof are in conducting position with the arms 20 and 21. By synchronizing the rotation of the gap with the charging current, there will be a discharge every time the wheel revolves a quarter of a revolution which will be one-half of a cycle of the charging current. By way of example with the position of the gap illustrated in this figure it may be assumed that the upper terminal of the transformer secondary is of positive polarity, and pulse current then will flow through the gap at the arm 20 out through the load to ground. The remainder of the circuit will be made up through the arm 21 and the arm 19 to ground 22. On the next half cycle when the bottom of the transformer secondary is positive the current will flow through arm 21 through the load to ground and back through arm 20 and arm 19 to ground. Thus the recurrent frequency of the pulses so formed will be twice the charging frequency while the shape and duration of the pulse will be affected by the constants of the pulse frequency network of which the capacitor 15 forms a part.

Referring to Fig. 2 there is shown the position of the spark gaps when the gaps have been turned a quarter of a revolution with respect to the same gaps illustrated in Fig. 1. Rotation is illustrated as being clockwise.

Referring to Fig. 3 there is shown the input arrangement for a three-phase source of supply. In this figure, three transformers are illustrated, having the primary thereof delta connected. Secondaries similarly are delta connected. A pair of inductive members 13 and 14 similar to those of Fig. 1 are connected to each of the secondaries and shunted across the series connection of these inductances and the secondary of each of the transformers is a pulse forming network identified as 30 which has been explained hereinbefore with reference to Fig. 1 and more particularly with reference to storage capacitor 15. A common lead may be used to ground for all of these circuits and a common lead may be used to the load. For purposes of convenience the terminals of the pulse forming network in each case have been identified as 40, 41, 42, 43, 44, and 45. With this arrangement a pulse frequency of 360 pulses per second with a 60 cycle three-phase input will be obtained.

Referring to Fig. 4 there is shown schematically the action of a spark gap with the multiple phase source and for purposes of convenience portions of the gap connected to the elements of Fig. 3 have been identified by the same figures. In this arrangement, the stationary gap arms are connected 60 electrical degrees apart around the periphery of a member containing the moving portions of the gap. A conducting ring 50 has connected thereto a moving arm member 53 which is adapted to pass in close proximity to the stationary arms 40 through 45, and positioned adjacent the conducting ring is a fixed electrode 48 which is grounded. A second conductive ring 51 is provided having an arm member 52 which is adapted to be turned thereby and which also passes in close proximity to the stationary electrodes. Positioned adjacent the latter conducting ring is a fixed electrode 54 which is grounded through the load 28. It will be obvious that by synchronizing the movement of the conducting rings 50 and 51 with their appertaining arm members, charging and discharging may be made to take place in the three-phase circuit similar to the manner in which it was accomplished in the single phase circuit of Fig. 1.

Referring to Fig. 5 there is shown a schematic representation of a particular form of spark gap which may be used and this is shown in cross section. For purposes of ease and clarity, only the stationary electrodes 40 and 41 have been illustrated. In this figure a shaft member 60 which is driven by the synchronous motor 25 has fastened thereto a rotor 61 which is insulating. The position of the ground ring 50 is shown with its proximity to the stationary electrode 48, the latter being grounded. Positioned further out from the shaft along the rotor is a conducting ring 51 which is positioned adjacent to stationary electrode 54, the latter being grounded through the load 28. Two arm members 52 and 53 are positioned near the outer periphery of the ring and the arm member 52 is connected to the load ring 51 by a conducting element 70 and the ground ring is connected to the arm member 53 by means of a conducting strip 71. This arrangement then is the equivalent of the spark gap shown schematically in Fig. 1.

It will be obvious to those skilled in the art that there may be deviations from the particular showing that has been explained here in full in this specification that still will remain fully within the spirit and scope of our invention and accordingly we claim all such deviations therefrom. By way of example, there has been illustrated in the drawings of this case the use of a rotating spark gap as a discharge apparatus, but it will be appreciated that there are other forms of discharge apparatus which could be substituted therefor.

What is claimed is:

1. In pulse generating apparatus, a source of energy pulsating at a predetermined rate, input transformer means, means for impressing said energy onto said input transformer means, energy storage means connected so as to have energy supplied thereto by said transformer means, a discharge path for said energy storage means, and means to render said discharge path conducting at a rate which is a multiple of the pulsating rate of the supplied energy whereby pulsations of a definite predeterminable frequency are produced.

2. Apparatus in accordance with claim 1 wherein said discharge path includes a spark gap.

3. Apparatus in accordance with claim 1 wherein said source of pulsating energy is multiphased.

4. In pulse generating apparatus, a source of energy cyclically fluctuating at a predetermined rate, energy storage means, means for supplying said energy to said energy storage means, a discharge path for said energy storage means and means for intermittently causing said discharge path to become conductive at a rate that is a multiple of the cyclic fluctuation of the cyclically fluctuating energy.

5. Apparatus in accordance with claim 4 wherein said discharge path includes spark gap means.

6. In a pulse generating apparatus, a source of energy alternating at a predetermined rate, input transformer means, means for impressing said energy onto said input transformer means, energy storage means comprising at least a capacitor connected across the output of said transformer means, a discharge path for said energy storage means including a load means, and means for alternately discharging said capacitor unidirectionally through said load means every half cycle of said alternating input energy whereby pulsations of a definite predeterminable frequency, which is a multiple of the frequency of said input energy, are produced.

7. In a pulse generating apparatus as defined in claim 6 wherein said source of energy is polyphase, said input transformer means having an input winding and an output winding for each phase of said polyphase energy, said energy storage means includes a capacitor connected across each output winding and said discharge path further includes means for discharging each capacitor in sequence.

DALE R. BRANCHFLOWER.
HARRY J. WHITE.
DAVID F. WINTER.

REFERENCES CITED

The following references are of record in the file of this patent:

UNITED STATES PATENTS

| Number | Name | Date |
|---|---|---|
| 2,326,074 | Slepian | Aug. 3, 1943 |
| 2,405,071 | Tonks | July 30, 1946 |